US011669772B2

(12) United States Patent
Chawla

(10) Patent No.: US 11,669,772 B2
(45) Date of Patent: Jun. 6, 2023

(54) 3D PRINTER DEVICE MANAGEMENT USING MACHINE LEARNING

(71) Applicant: VMWARE, INC., Palo Alto, CA (US)

(72) Inventor: Ravish Chawla, Marietta, GA (US)

(73) Assignee: VMWARE, INC., Palo Alto, CA (US)

( * ) Notice: Subject to any disclaimer, the term of this patent is extended or adjusted under 35 U.S.C. 154(b) by 666 days.

(21) Appl. No.: 16/674,551

(22) Filed: Nov. 5, 2019

(65) Prior Publication Data

US 2021/0133625 A1 May 6, 2021

(51) Int. Cl.

*G06F 21/00* (2013.01)
*G06N 20/00* (2019.01)
*B33Y 50/00* (2015.01)
*H04L 9/40* (2022.01)
*G06N 5/04* (2023.01)

(52) U.S. Cl.

CPC .............. *G06N 20/00* (2019.01); *B33Y 50/00* (2014.12); *G06N 5/04* (2013.01); *H04L 63/101* (2013.01)

(58) Field of Classification Search

CPC .......... G06N 20/00; G06N 5/04; B33Y 50/00; H04L 63/101; H04L 63/104

See application file for complete search history.

(56) References Cited

U.S. PATENT DOCUMENTS

2014/0058959 A1 2/2014 Isbjornssund
2014/0283104 A1* 9/2014 Nilsson .................. G06F 21/10 726/26
2015/0036174 A1 2/2015 Pettis
2015/0165685 A1 6/2015 Klappert
2016/0042255 A1 2/2016 Ganesh
2017/0218660 A1 8/2017 Muchna
2017/0308339 A1 10/2017 Yamazaki
2019/0325436 A1 10/2019 Cheng
2020/0269511 A1* 8/2020 Vasil ...................... B33Y 50/00
2020/0326683 A1* 10/2020 Oligschlaeger ....... H04L 9/0819
2022/0215386 A1 7/2022 Yonekura

FOREIGN PATENT DOCUMENTS

WO WO2020054612 3/2020

OTHER PUBLICATIONS

Mack, E. (Jun. 11, 2018). What is whitelisting and how should you implement it? Springboard Blog. Retrieved Jul. 6, 2022, from https://www.springboard.com/blog/cybersecurity/what-is-whitelisting/ (Year: 2018).*

* cited by examiner

*Primary Examiner* — Kendall Dolly
(74) *Attorney, Agent, or Firm* — Clayton, McKay & Bailey, PC

(57) ABSTRACT

Systems and methods for 3D printer management can allow or reject printing of an object based on a model that is trained with machine learning. In one example, the model classifies the object according to object type. The object type can be compared against a list, such as a whitelist or blacklist, to determine whether to block the object from printing. The lists can be specific to users, such as based on an organizational group to which the user belongs. A print server can apply the model prior to forwarding the object to a 3D printer for printing. Both the models and the lists can evolve based on machine learning, such as based on which print decisions receive override from administrators.

17 Claims, 5 Drawing Sheets

110 USER DEVICE
112 PROFILE
114 OBJECT
120 PRINT SERVER
122 GROUPS
124 RULES
126 MODELS
160 3D PRINTER
130 MODEL SERVER
132 MODELS
134 TRAINING
140 TAGS
150 DP

3D PRINTER DEVICE MANAGEMENT USING MACHINE LEARNING

BACKGROUND

Three-dimensional ("3D") printers are increasingly prevalent within enterprise environments. Workers can use 3D printers to print objects as part of their job. For example, 3D printing can speed the process of product development by allowing workers to print multiple prototypes in a short amount of time. Printed protypes can be tested and workers can change the object until an optimal design is reached. The object itself can be, for example, a computer-aided design ("CAD") file, an STL file, an OBJ file, or some other file type that describes 3D shape information (e.g., geometry) and is recognized by 3D printers.

However, problems can arise when workers print objects that are less directly related to their job. For example, workers can print any unrelated object, using up limited extrusion materials that an enterprise may have available. The printed objects themselves can be distracting. Instead of performing job tasks, workers can waste time designing toys to print as cubicle decorations.

More seriously, workers can also 3D print potentially offensive or harmful items. For example, objects that resemble or act as weapons can be 3D printed at the workplace. Objects resembling knives or firearms can pose security risks. Crude items can make some employees uncomfortable.

In addition, even when workers are appropriately using 3D printers as part of the creative process, workers may not know that their designs are similar to existing design patents. Workers may be printing a patented design, exposing the enterprise to potential liability for patent infringement.

As a result, a need exists for new systems to manage 3D printers.

SUMMARY

Examples described herein include systems and methods for managing the printing of 3D objects in an enterprise. In one example, a print server can receive a print request from a user device. The print request can include an object for 3D printing. The print request can also identify the user device making the request. The print server can be a separate device from the 3D printer or can execute virtually using a processor of the 3D printer, in different examples.

An agent executing on the print server or 3D printer can apply a model to the object to determine a classification. The classification can represent an object type, such as a "gear" or a "ball." The model can be pre-trained to output these classifications through application of machine learning algorithms. For example, a training process can analyze one or more databases of objects. The objects in those databases can include metadata that identifies a corresponding object type, allowing training processes to build a model that outputs an object type classification. When the model is applied to the object, the model can utilize shape information of the object, as well as metadata, to determine the appropriate classification.

The agent can then use the classification to determine whether to allow the print request. In one example, the agent does so by comparing the classification against a list, such as a whitelist or a blacklist. For example, a whitelist can include object classifications that are allowed, whereas a blacklist can include object classifications that are disallowed. If the list comparison reveals that the object is allowed (or not disallowed), then the object can print at the 3D printer.

In one example, different lists can apply to different organizational groups. The user device can be associated with one or more of the organizational groups. This can allow an enterprise to distinguish who can print which types of objects. Such distinctions can save printer usage and ensure productive use of the 3D printers. The group-specific lists can be sent to a printer or print server from a management server. The management server can track which object types are allowed for which groups. As the lists are updated, new lists can be proliferated from the management server to the print server or the 3D printers.

In another example, a model can be trained that relates to design patents. For example, machine learning algorithms can analyze a patent office database of design patents to create the model. The classifications from this model can relate to how close the object appears to drawings in a design patent. Different closeness classifications can be allowed for different organizational groups.

If a print request is denied, an alert can be sent to an administrator. This can be an email or text, in an example. The alert can identify the classification of the object. The alert can also identify the object itself, in an example, such as by providing a link to the object. This can allow the administrator to investigate potential issues with regard to what employees are attempting to print.

These stages can be performed by physical devices that execute an agent, in an example. For example, the stages can be part of a system that includes a print server that executes the agent to apply the models. Alternatively, a 3D printer can execute an agent and perform some or all of the print server functionality. The agent can communicate with servers to apply the models, in an example. Alternatively, a non-transitory, computer-readable medium including instructions can cause a processor at the printer or print server to perform the stages when the processor executes the instructions. The term "agent" can broadly refer to any process executing on a physical device for performing the managed printing functionality.

Both the foregoing general description and the following detailed description are exemplary and explanatory only and are not restrictive of the examples, as claimed.

DESCRIPTION OF THE EXAMPLES

Figure 1:
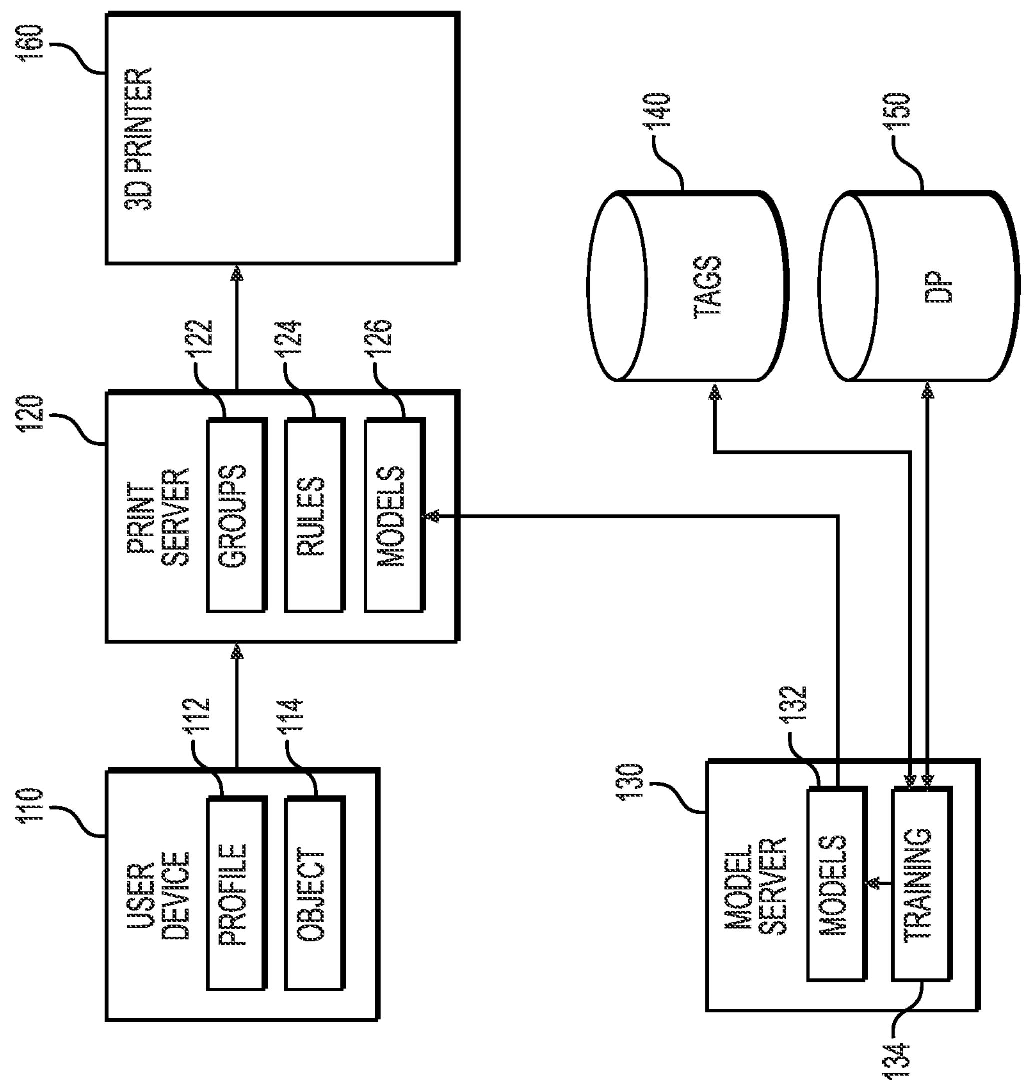
FIG. 1 is an example illustration of system components used for managing 3D printing.

Reference will now be made in detail to the present examples, including examples illustrated in the accompanying drawings. Wherever possible, the same reference numbers will be used throughout the drawings to refer to the same or like parts.

In one example, the system can determine whether to allow a 3D printing request prior to printing an object. An agent operating at the requesting device, a print server, or on the 3D printer itself can receive the print request. A model can be applied to the object to classify that object into one or more classification categories. The agent can allow or deny the print job based on a classification (i.e., category).

The model can be trained using one or more machine learning algorithms that a machine learning engine can execute. In one example, the model can use object metadata and shape (e.g., geometry) information to determine whether to accept or reject the print request. The classifications from the model can describe an object type, such as toy, spaceship, weapon, or some specifically identified part. This can help management classify categories that should be blacklisted in according to job relatedness. For example, different object types can be printable by different organization groups within the enterprise. In one example, the classifications can be compared to an offline list, such as a whitelist or blacklist, to determine if printing is allowed. The list can also apply to tags in the metadata of the object, in an example. In one example, the classifications of the model can be added as tags to the existing tags of the object, then compared against the list.

In one example, multiple different models exist. The models applied to a particular user can depend on the job function of that user or an organizational group that the user belongs to. A model can also be trained and used to flag objects that risk infringement of design patents. Classifications can alternatively represent reasons for denying of the 3D printing, such as disallowed content, unrelated content, or too big of a print job. The classifications likewise can represent reasons for approval of a print job, such as categorizing an object as "work related."

When the classification reveals that the object should not be printed, a denial can cause the agent to block the 3D printer from printing the object. For example, if an agent on the print server determines that the print request should be denied, the print server can send a denial to the user device from which the request originated. In one example, the user can then use a GUI to request override from an administrator. This request can be routed to an administrator device, such as by text, email, or messaging to an application. The administrator can review the object that the user has requested to print and, in some examples, the reasons for initially denying the print request. The administrator can then allow or deny the print job. An allowed print job can then be routed successfully back to the 3D printer for printing.

In one example, when a user's print request is denied, the agent can block the user from printing any other objects until an administrator has released the block. In other words, the block can apply to anything the user attempts to 3D print, not just the object that is initially rejected.

Using machine learning to classify objects can allow for an adaptive approach to recognizing and blocking inappropriate print requests. Whereas a less dynamic blacklist on its own would allow users to make slight alterations to otherwise blocked content, the models described herein can still recognize and classify such objects in a way that allows better management of the print process.

FIG. 1 is an illustration of example system components. In this system, a print server 120 is utilized to route a print request from a user device 110 to a 3D printer 160. The print server 120 can be part of an enterprise mobility management ("EMM") system. The print server 120 can ensure that printing of the object is allowed. To do this, the print server 120 can execute an agent that reviews the object 114 that is part of the print request from the user device 110. The user device 110 can be associated with a profile 112 that allows the print server 120 to determine which rules 124 apply to the user device 110. The rules 124 can include lists (i.e., whitelists or blacklists) to apply to object classifications. The rules 124 can also include maximum extrusion materials or print times for certain users or organizational groups 122. As will be discussed, models 126, 132 trained by a machine learning engine ("ML engine") 134 can be applied to obtain classifications, which in turn can be compared to the lists.

When the user device 110 requests printing, the object 114 can be sent to the print server 120 as part of a file, as described in more detail below. To determine whether to print the object 114, an agent on the print server 120 can apply one or more models 126 to the object 114 and check one or more rules 124. As will be discussed, models 126 can be trained using machine learning. A first model 126 can be trained to classify objects 114 according to object type. This can indicate what the object 114 is, such as a ball, a spring, a piston, a gun, or any other type of object that could be printed. The rules 124, on the other hand, can indicate attributes and classifications that are allowed or disallowed. For example, the user may only be permitted to use a maximum number of colors or specific colors. The user may also only be able to print certain object types. The rules 124 and models 126 can be maintained and provided to the print server from a management server, which can include a model server 130, in an example.

Some rules 124 may be applicable without a model 126, based on object metadata. Metadata features comparable against rules can include tags for object type, filament use, time to print, and color. In one example, the metadata can include tags used in object databases 140 for classification (also referred to as categorization). For example, tags can allow users to electronically search for and locate particular types of objects 114. These tags can be retrieved by an agent at the user device 110, print server 120, or even the 3D printer 160. The agent can the compare the tags against the rules 124, which can include a whitelist of allowed object types and a blacklist of disallowed object types. This whitelist or blacklist comparison can be determinative in some cases. For example, a tag that represents a knife can be a direct match with a blacklisted tag for weaponry. This can cause the agent to deny printing, assuming the organization group has disallowed printing of weaponry. However, the metadata itself may not be enough to determine whether to allow the print job.

But in one example, the agent can apply one or more models 126 to the object 114 to determine an object classification. Classifications can indicate object types. A model 126 can return multiple classifications in an example. Then, these classifications can be compared against a list, such as a whitelist or blacklist, to determine whether to print the object 114. The system can allow or block different object types depending on what types of objects the user is allowed to print. For example, printing can be restricted differently based on which organizational group 122 a user device 110 is associated with. A user device 110 in a first organizational group can have different printing privileges that a user device in a second organizational group. For example, an executive group can have no limit on extrusion material but can have a different blacklist of unapproved objects than a secretarial group. A mechanical engineering group likewise can have a more lenient blacklist but can have maximum material quotas. Whereas no group can print a gun, the mechanical engineering group can be allowed to print a piston, in an example.

The user's profile 112 can indicate which lists apply to that user, in an example. This can allow administrators in an EMM system to assign different whitelists of acceptable objects and different blacklists for unacceptable objects, which can be helpful if a particular employee is abusing 3D printing. Likewise, the profile 112 can indicate a group with which the user is associated. This group can then be associated with a list, such as a whitelist that is specific to that group. In this way, the system can ensure users are printing objects 114 that correspond to their job task.

The lists can be set up by an administrator at the management server, in an example. However, machine learning can also update the lists based on manual overrides that occur. In one example, if the model 126 categorizes an object 114 in such a way that it is denied from printing based on a list, the print server 120 can send a notification to the management server. An administrator can review the denied request and override the denial. Override decisions can be stored by the system. An algorithm can analyze the overrides and recognize trends in which object types are commonly allowed even though not present in a whitelist or present in a blacklist. The algorithm can then adjust the appropriate lists, in an example. For example, if a gear is commonly rejected but given override acceptance, a gear classification can be added to a whitelist or removed from a blacklist. These updated lists can then be provided to the print server 120.

The models 126 can exist locally on the print server 120, in an example. For example, these models 126 can be periodically received from the model server 130 as updates to models 132 there occur. Alternatively, the print server 120 can send the object 114 to the model server 130 for comparison with those remote models 132.

Models 132 can be built and trained at a model server 130 using machine learning, in an example. For example, the model server 130 can train the model 132 using ML engine 134 based on objects existing in one or more databases 140. Those objects can contain both shape information and tags that denote object types. In one example, a convolutional neural network is created that outputs similar classifications based on similar shape information.

In one example, the model server 130 can also use the machine learning algorithms to train a model 132 that is based on existing design patents. To do this, the ML engine 134 can apply a machine learning algorithm on one or more design patent databases 150. The resulting design patent object model 132 can incorporate geometries and tags that correlate to drawings in design patents.

A trained model 132 can be sent to the print server 120 for use. An object type model 132 can allow the print server 120 to determine what type of object the user is trying to print. Likewise, a design patent model 132 can allow the agent to flag an object as potentially patented. In one example, the model classifies the likelihood that the object 114 is covered by a design patent. For example, if the user attempts to print a flashlight, the agent or model server 130 can apply the flashlight object 114 to the design patent model 132. In one example, if the geometries of the object 114 meet a threshold similarly to the trained geometries of the model 132, then the model can output a high likelihood that the object 114 is covered by a design patent. The agent can then reject the print request.

A design patent model 132 can be specific to a particular object type, such as flashlights, in an example. In that example, a first model can classify the object 114 as a flashlight. Then the agent can apply the object 114 to a flashlight design model. This approach can be advantageous when an enterprise is engaged in designing or making particular object types. By training a design patent model 132 that is focused on the products the enterprise designs, the detection of relevant design patents can be more accurate. Such accuracy can help minimize work intrusion and result in appropriate attention when a print job is denied based on design patent detection. To train for specific product types, the ML engine 134 can incorporate keywords that get compared to design patent text. This can allow the ML engine 134 to ignore irrelevant design patents (directed to different object types) in training the model 132.

If comparison with the rules 124 and models 126 indicates that printing is allowed, the print server 120 can send the object 110 to the 3D printer 160 for printing. The user can be notified at the user device 110 of the print status. The rules 124 (e.g., lists) can also be updated periodically by a model server 130 (or management server), in an example. The lists can evolve, based on feedback from administrative devices, such as denials or acceptances of other print requests. Additionally, an administrative GUI can allow an administrator to define appropriate or inappropriate objects for different organizational groups 122. In one example, the administrator-defined list is used as an offline rule 124 at the print server 120. But based on further machine learning training, the model server 130 can update the list. Then the print server 120 can receive the updated list and use it as a rule 124 for future print decisions.

In another example, the rules 124 and models 126 exist on a 3D printer 160 instead of the print server 120. In that example, the 3D printer 160 can include an agent that performs the comparisons discussed with regard to the print server 120. The agent can also communicate with the model server 130 in the ways explained with regard to the print server 120.

Figure 2:
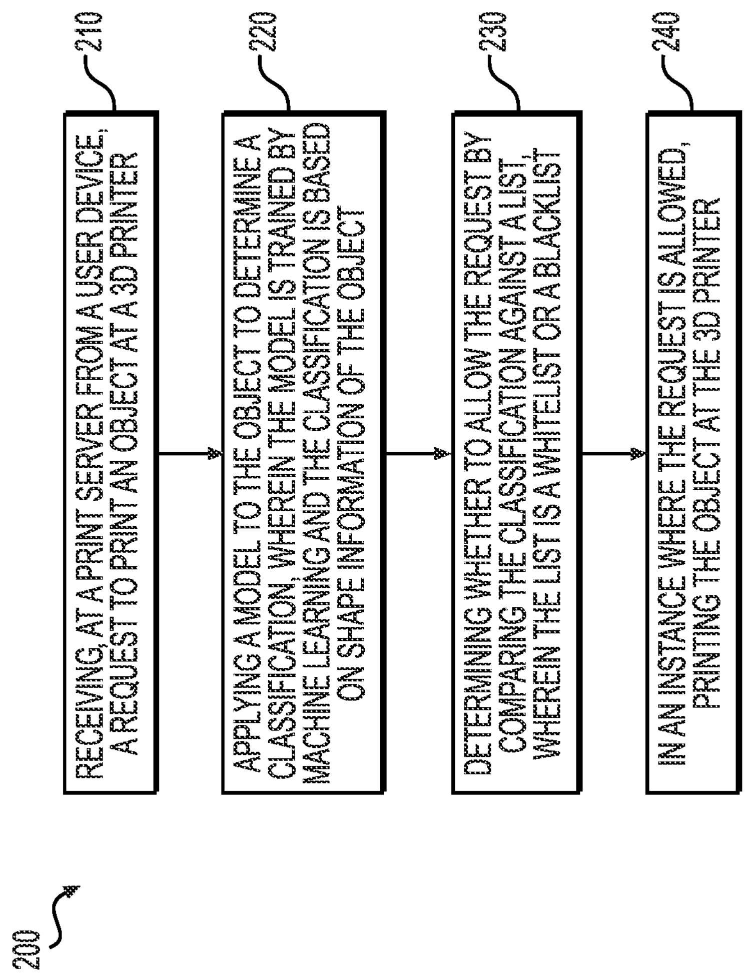
FIG. 2 is a flowchart of an example method for managing 3D printing.

FIG. 2 is an example flow chart for 3D printer management using machine learning. At stage 210, a print server 120 can receive a request to print an object 114 at a 3D printer 160. Alternatively, the request can be sent to the 3D printer 160, in an example. The device that receives the request can execute an agent that performs various checks on the object 114 before carrying out the print job.

The request can include the object 114 in one example. The object 114 can be any file format compatible with a 3D printer 160. For example, the object 114 can be a .3DS, CAD, .OBJ, .GITF, .STL or another file type.

The object 114 can include shape information that describes what will be printed. Shape information can include points, vectors, shapes, geometries, sizes, diagrams or any information used to describe dimensions of the object 114. Other metadata can also describe aspects of the object 114. For example, tags can describe categories to which the object 114 belongs. As an example, a first tag for "toy" and a second tag for "spaceship" can apply to an object 114.

At stage 220, the agent can apply a model 126 to the object 114 to determine a classification. The model 126 can be pre-generated based on machine learning. In one example, the model 126 can be a convolutional neural network. The model 126 can classify the object 114 into one of multiple classifications, which can be object type categories. A subset of those classifications can be allowed to print, whereas other categories cause the print request to be blocked.

The classifications can be trained based on tags in object databases 140. For example, a machine learning algorithm of the ML engine 134 can train on databases 140 of CAD files. The CAD files can include tags representing categories. After this training, the model 132 can predict classifications for user-submitted objects 114 based on the shape information and metadata of the object 114. Different models 132 can be trained for different file types, in an example. For example, a CAD file model can differ from an STL file model. The models 132 can be sent to the print server 120 or 3D printer 160 for local use (i.e., as a local model 126), in an example.

The agent can apply the model 126 to the object 114 locally or by sending the object to a model server 130. In one example, the model outputs at least one classification. At stage 230, the print server 120 can accept or deny the print request based on the object classification. For example, the print server 120 can compare the classification against a list, such as a whitelist or blacklist, to determine whether to allow the print request. The allowed classifications can be different based on the user's status within the enterprise. For example, different lists or even different models can apply to different organization groups to which the user can belong. As an example, the object classification can be "toy." An executive may have a corresponding whitelist that includes "toy." However, a secretarial group may not have "toy" in their corresponding whitelist.

At stage 240, in an instance where the request is accepted, the 3D printer can print the object 114. For example, the print server 120 can send the object 114 with a print instruction to the appropriate printer 160.

In one example, the request is denied at stage 240 based on the list comparison of stage 230. However, the denial can be sent to both the user who submitted the request and a supervisor, in an example. The supervisor can override the denial in an example, which can cause the 3D printer to print the object at stage 240. The override can reroute the print request in one example. The rerouted request can include, for example, a key generated based on the administrative approval that is compared against a key stored in a backend system. The model server 130 can take such reversals of denial into account in training the model to allow such items in the future. Likewise, new lists for offline use can be generated by the model server. In some examples, an override can be accompanied by an indication from the supervisor whether the override is applicable to only the present print request or also to future requests. In those examples, additional training based on the override will only be performed where the supervisor indicates the reversal is applicable to future requests.

Figure 3:
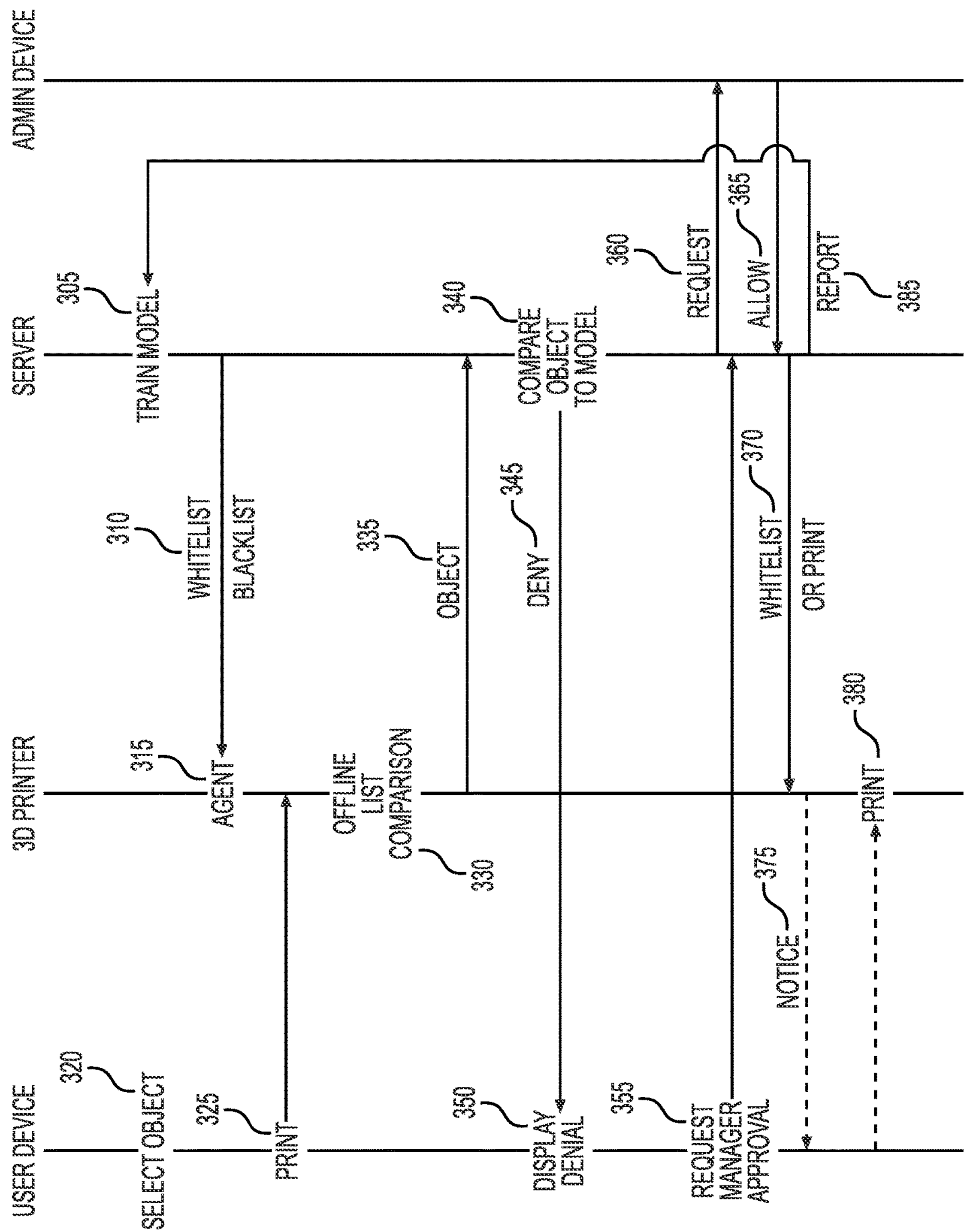
FIG. 3 is an example illustration of a sequence diagram for managing 3D printing.
Figure 4:
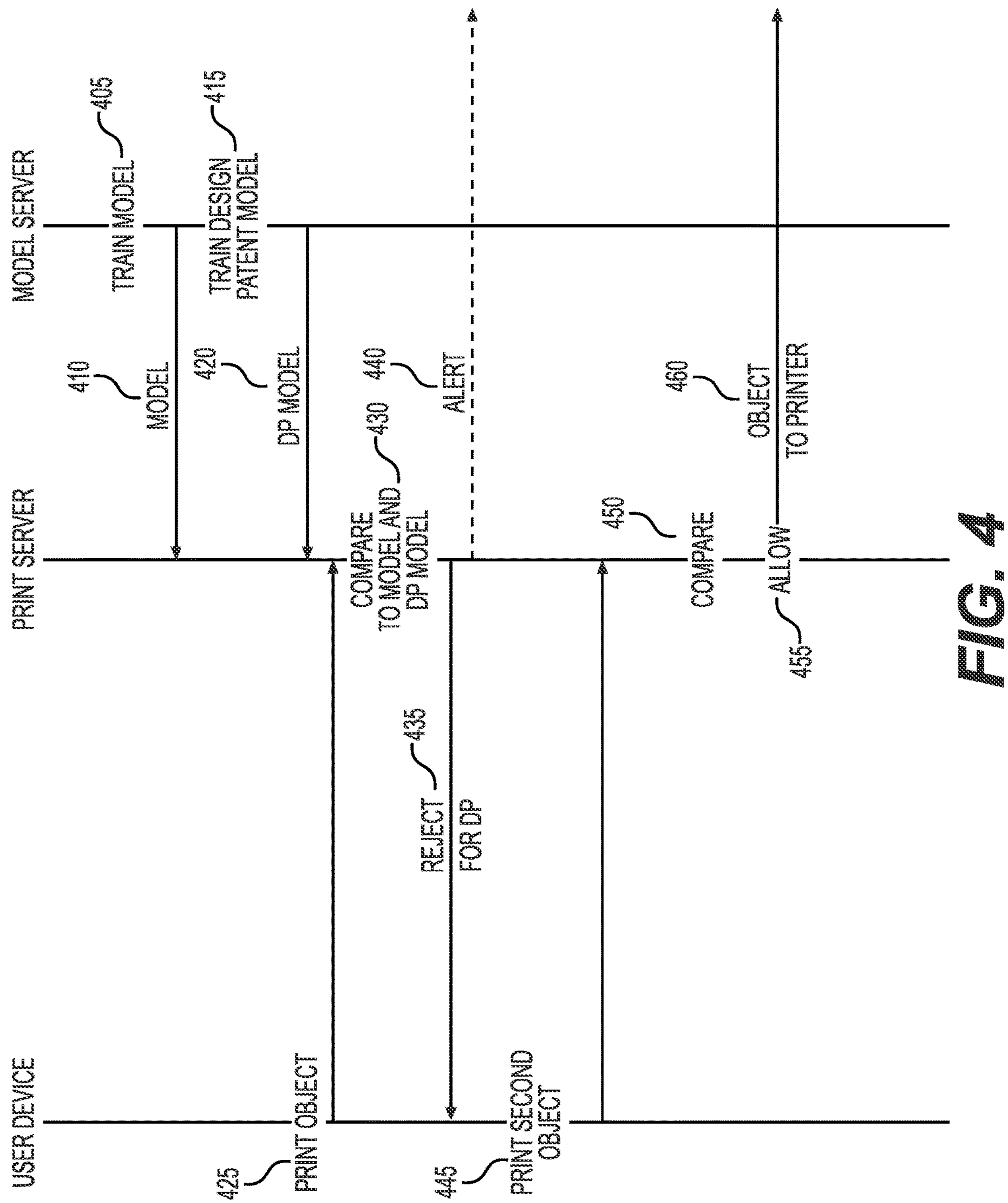
FIG. 4 is an example illustration of a sequence diagram for managing 3D printing.

FIGS. 3 and 4 are example sequence diagrams for managing printing of 3D objects 114 by using machine learning. FIG. 3 includes printing to a 3D printer without a separate print server, whereas FIG. 4 implements a print server.

Turning to FIG. 3, at stage 305, a server can train a model 132 using ML engine 134, for example. This can include running one or more machine learning algorithms against a database 140 of existing objects. The existing objects can include metadata with tags that are used to classify those objects, for example, for location via search by a user. The training can therefore result in a model 132 that outputs object classifications based on object 114 shape information and metadata.

The server can be a model server 130 in an example. It can also be a management server that manages user profiles, organizational groups, and performs EMM tasks. In one example, the model server 130 is part of the management server.

At stage 310, the server can send one or more lists to a 3D printer for use in allowing or rejecting print requests. An agent executing on the 3D printer at stage 315 can communicate with the server and receive the lists. The 3D printer may not have the processing power to implement the full model 132 trained at stage 305, in an example. But the lists can still be compared against object metadata (e.g., tags) in an example. In another example, the server sends the model 132 to the 3D printer for classifying objects that may not have tags that reveal classifications.

At stage 320, the user can select an object 114 to print. The selection can occur on the user device, which can execute a client for 3D printing. The user can select an option to print at stage 325, causing the object 114 to be sent to a 3D printer.

At stage 330, the printer can make an offline determination of whether to print the object 114. In other words, this determination can be made without sending the object 114 to the server, in an example. The offline determination can include comparing the object 114 to the lists received at stage 310. In one example, an agent on the 3D printer can extract metadata, such as tags, from the object 114. This metadata can then be compared against a whitelist or blacklist to determine whether printing is allowed.

In an example where the 3D printer is powerful enough to apply the model 132 and receives it for use locally, the agent can apply the model 132 to the object 114 at stage 330. Then the resulting classification can be compared against the lists.

If the comparison at stage 330 is not dispositive of whether to allow the print request, at stage 335 the 3D printer can send the object 114 to the server. For example, if the lists are on the server, the 3D printer can send the object 114 to the server for list comparison purposes.

At stage 340, the server can apply a model 132 to the object 114. This can be a more elaborate or otherwise different model 132 than is available on the 3D printer. The model 132 can output a classification for the object 114. The classification can be compared against a list to accept or reject the print request. In one example, the classification is returned to the 3D printer, where it is compared against the whitelist or blacklist.

In this example, at stage 345 the print request is denied based on the model classification. The denial can be sent to user device 110 (either by the server or the 3D printer). The user device 110 can then display the denial at stage 350. The denial can also be reported to an administrator device, in an example. This can allow an administrator to know if users are attempting to print prohibited objects.

The denial can also prevent the user from printing other objects, in an example. This can mitigate against a user making slight modifications to a denied object in order to gain approval, and can require administrative intervention in an example. An agent on the user device can disable printing to a 3D printer in an example. Alternatively, the server can block all 3D print requests for the user by storing user information in association with the block. In an example where a global block is applied to the user based on the denied print request, the server can notify the administrator device of the denial and prompt whether the block should be lifted block without the user specifically requesting it. For example, if the denial causes the server to block all future print requests for 3D objects by the user, the server can send a request at stage 360 that can allow the administrator to lift the block.

In one example, the user can then request managerial approval for printing the object 114 at stage 355. The managerial approval can also be sought for reenabling print capabilities for 3D objects after the user has been blocked. When received, this override request can be sent to a server, which can forward the request to the appropriate administrator device at stage 360. In some examples, an administrator device is selected based on the nature of the print denial. For instance, a denial based on a lack of available material, a blacklisted object, or a potential design patent infringement (as described in more detail below) can be sent to an office manager, an executive, or a member of a legal team, respectively. The administrator can allow the print request at stage 365.

The override can be reported to the training algorithm at stage 385, in an example. This can allow the training to take overrides into account when creating models 132. In one example, the server can update a whitelist based on the override. The updated whitelist can be sent to the 3D printer at stage 370. The user can also receive notice of the override at stage 375. Requesting the 3D printer to print the same object 114 again, therefore, can result in printing at stage 380.

FIG. 4 is another example sequence diagram for managing printing of 3D objects 114. In this example, print requests are sent to a print server 120, which manages which objects 114 get printed by which printers. At stage 405, the model server can train a model, like in stage 305 of FIG. 3. This can include running a convolutional neural network against a database of CAD files or some other object format. The trained model can consider at least one of shape information and metadata of the object 114 to determine a classification of the object 114.

In one example, the training can include training a design patent model at stage 415. This training can include image recognition technology to determine a three-dimensional shape based on the various views required for design patents. A convolutional neural network can compare object files against known related design patents to determine correlations between the shape information and the drawn views of the design patents, in an example. The output of the model can be trained to either identify a design patent meeting a threshold similarity, or to classify an object based on likelihood of similarity to a design patent. In one example, the training can be limited to particular object types, such as design patents related to a hinge.

At stages 410 and 420, the trained models 132 can be sent from the model server 130 to the print server 120. The print server 120 can execute an agent that uses the models to classify objects 114 received with print requests. This can be advantageous since the print server 120 can have more processing power and flexibility than a printer in some circumstances. The print server 120 can be managed as part of an EMM system. The management server can supply the agent to the print server 120 along with the lists used for allowing or disallowing certain object classifications.

At stage 425, a user can attempt to print an object 114 with their user device 110. This can include selecting the object 114 and selecting a print function, which can generate a print request. The print request can be routed to the print server 120, which can hold the credentials for printing at one or more 3D printers. The print request can identify the user or user device 110 and can include the object 114.

At stage 430, the print server can apply one or more models 132 to classify the object and determine whether to allow the print request. A first model 132 can provide an object type as a classification. A second model 132 can provide a likelihood of design patent coverage as a classification. The print server can compare the classifications against one or more lists that apply to the user. For example, a whitelist for a developer group can apply when the user belongs to the developer group. The print server 120 can be provided with information from the management server that relates the lists to particular users, user devices, or groups.

If the user device 110 is not recognized, then the print server 120 can reject the print request without further analysis, in an example. Otherwise, the print server 120 can identify one or more related lists (whitelists or blacklists) and apply those to the classifications. For example, if a whitelist includes "mechanical part" or "gear," and the classification is for "mechanical part," then the print request can be allowed.

But in the example of FIG. 4, the design patent classification indicates that the print request should be rejected. So, at stage 435, the print server 120 sends a rejection message back to the user device 110. The message can indicate the design patent classification so that the user can know why the request was rejected. In addition, an alert regarding potential design patent issues can be sent to an administrator at stage 440. This can allow an administrator to investigate potential design patent issues that may be relevant to objects that the enterprise is making or designing.

In one example, a global block against the user printing 3D objects can be put in place based on the denial. The alert at stage 440 can allow the administrator to lift the block. In one example, blocks are applied for some categories of denial but not others. For example, a weapons category could result in a global block, whereas a parts category would not, in an example.

The user can then select a second object to print at stage 445, sending a second print request to the print server 120. The print server 120 can apply the models 132 and compare the classifications to lists at stage 450. This time, the lists can indicate that the print request should be allowed. For example, no match may exist with a blacklist. The object 114 can then be sent to the appropriate 3D printer at stage 460.

Figure 5:
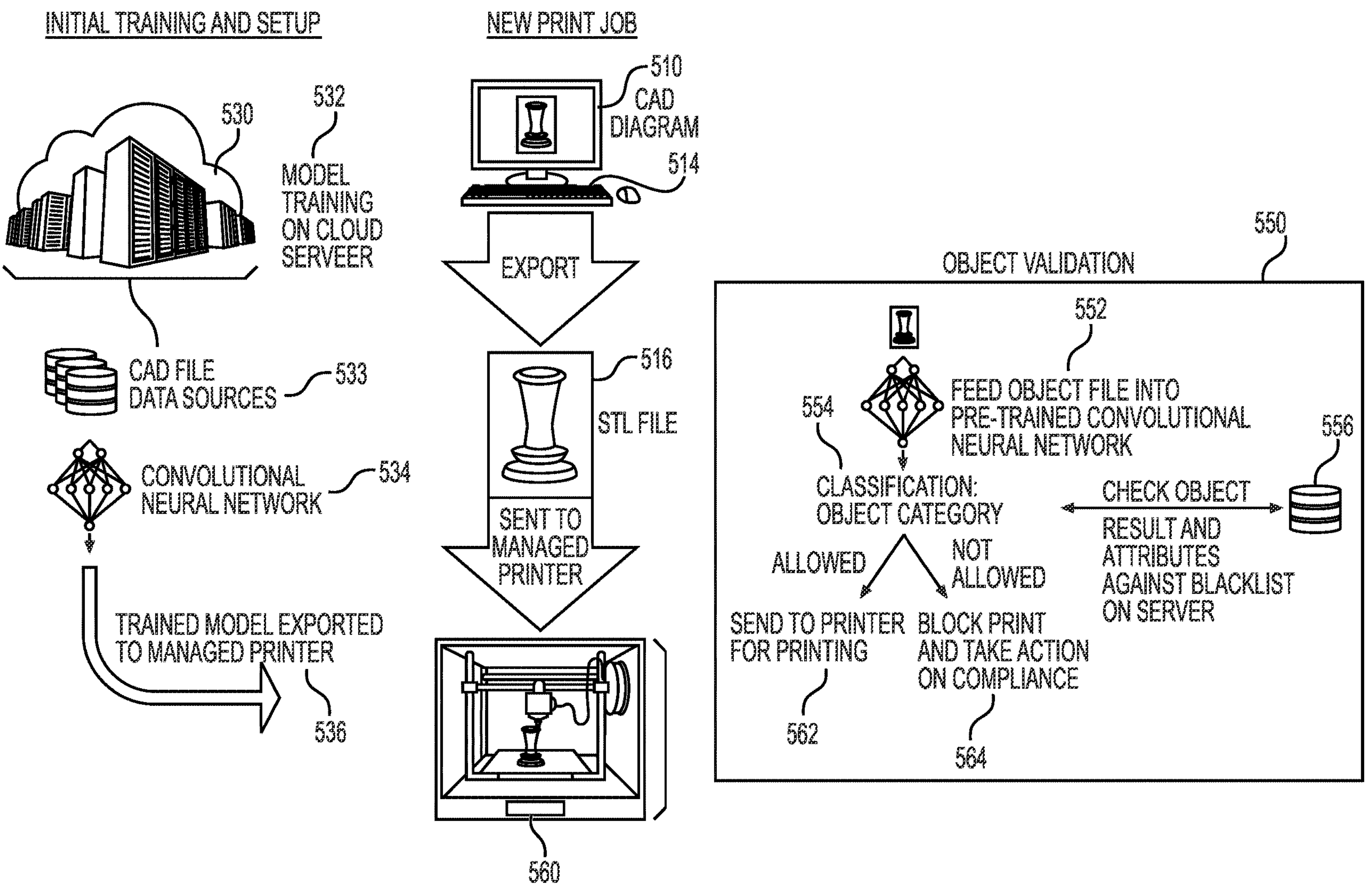
FIG. 5 is an example illustration of system components and stages for 3D printing.

FIG. 5 is a system diagram with components and stages for managing 3D printing of objects, in an example. Initial model training can occur at stage 532 on a model server 130, which can be multiple cloud servers 530 in one example. In general, one or more cloud servers 530 can be used to carry out model server 130 and management server functionality. A server can have one or more processors and execute instructions on a physical non-transitory storage medium.

The cloud servers 530 can build a model that utilizes a convolutional neural network 534, in an example. The model can be trained based on CAD file data sources 533, in an example, which can include one or more databases of objects. The model can be built to classify the object according to type, in an example. However, as has been described, other models are also possible, such as a design patent model.

At stage 536, the trained model can be sent to a managed print server 120 or a managed printer 560. The managed device can execute an agent that is preconfigured to apply the model to objects that are part of incoming print requests. For example, a managed printer 560 can include a processor with programmable capabilities. The managed printer 560 can be programmed to execute the agent rather than simply printing all objects in a print queue. The managed printer 560 can also have storage space for storing the trained model and any lists associated with that model for determining whether to allow a print request.

A user device 510 can display an object, such as a CAD diagram. The user device 510 can be a personal computer, laptop, tablet, phone, or any other processor-enabled device. The user can make selections at stage 514 to print the object, causing the user device 510 to export the object to the managed printer 560 (or print server 120). In this example, the object is an STL file 516. However, any file type is possible. In one example, print server 120 or managed printer 560 utilizes a model that is built for application to the particular file type. Therefore, a first model can be used for an STL file 516, but a second model can be used for a CAD file.

The agent running on the print server 120 or managed printer 560 can then validate the object prior to printing it. The agent can apply the model to the object. This can include, at stage 552, inputting the object file into the model's pre-trained convolutional neural network. At stage 554, the model can then output a classification. The classification can represent an object type category, such as "ball" or "wheel."

Then, the agent can determine if that classification is allowed for printing. As has been discussed, this can be based on the user's particular permissions, since different users can be configured to allow the printing of different object types. In one example, the agent can contact a server 556 and identify the user device and the classification. The server 556 can determine an appropriate list for that user, such as a blacklist, and compare the classification against that list.

If the blacklist has a match, then the server 556 can return a message to the agent denying the print request at stage 564. This can effectively block printing. In some examples, additional compliance precautions are then taken by the EMM system. For example, an administrator can be alerted regarding the user's blocked attempt to use the 3D printer. This can be helpful if the attempt was malicious, such as to print a weapon. But it can also be useful when the user was trying to complete a job task. The administrator can, in one example, override the denial and ensure that the user is not blocked in the future from printing objects related to their job task.

Otherwise, if the list comparison shows that the print should be allowed or at least not blocked, then at stage 562 the object can be printed. If the validation occurs at a print server 120, then the object can be sent to a relevant printer 160, 560. But if the validation occurred at the printer 160, 560, then the agent on the printer 160, 560 can place the object in the print queue.

Although examples have been discussed where a print server acts as an intermediate device between the user device and a 3D printer, in another example the agent on the 3D printer executes a print server. For example, the agent performs print server functionality by receiving incoming print requests, prioritizing them, and determining whether the print job should take place. When the agent has validated an object, the agent can place the object into a separate print queue that exists on the 3D printer. Additionally, either the print server 120 or the 3D printer 160, 560 can offload some or all functionality to a server with regard to applying the trained models. In one example, the pre-trained convolutional neural network 534 can be processor intensive. Therefore, either the print server 120 or the 3D printer 160, 560 can gain processing efficiencies by routing objects to a server where the model resides, in an example. The examples herein are not meant to limit the locations of these various functions unless otherwise specified.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for 3D printer management, comprising:

receiving, at a print server from a user device, a request to print an object at a 3D printer;

applying a model to the object to determine a classification, wherein the model is trained by machine learning and the classification is based on shape information of the object;

determining whether to allow the request by comparing the classification against a list, wherein the list is one of multiple lists received at the print server from a management server, the multiple lists corresponding to different enterprise groups;

wherein the list is automatically selected for comparison based on the user device belonging to a first group of the different enterprise groups;

wherein the list is a whitelist or a blacklist; and in an instance where the request is allowed, printing the object at the 3D printer, wherein the classification represents an object type, wherein the whitelist includes allowed object types, and wherein the blacklist includes disallowed object types.

2. The method of claim 1, wherein the list is the whitelist and corresponds to an organizational group of an enterprise, the user device being associated with that organizational group, wherein different organizational groups have different whitelists.

3. The method of claim 1, wherein the list is the blacklist and is received at the print server from the management server.

4. The method of claim 1, wherein the model identifies similarity to a design patent, and wherein the list is the blacklist that disallows matching design patents.

5. The method of claim 1, wherein the model includes a first model for identifying object types and a second model for identifying similarity to design patents.

6. The method of claim 1, further comprising, in an instance where the request is denied, sending an alert to an administrator that identifies the classification of the object.

7. A non-transitory, computer-readable medium comprising instructions that are executed by a processor to perform stages for 3D printer management, the stages comprising:

receiving, at a print server from a user device, a request to print an object at a 3D printer;

applying a model to the object to determine a classification, wherein the model is trained by machine learning and the classification is based on shape information of the object;

determining whether to allow the request by comparing the classification against a list, wherein the list is one of multiple lists received at the print server from a management server, the multiple lists corresponding to different enterprise groups;

wherein the list is automatically selected for comparison based on the user device belonging to a first group of the different enterprise groups;

wherein the list is a whitelist or a blacklist; and in an instance where the request is allowed, printing the object at the 3D printer, wherein the classification represents an object type, wherein the whitelist includes allowed object types, and wherein the blacklist includes disallowed object types.

8. The non-transitory, computer-readable medium of claim 7, wherein the list is the whitelist and corresponds to an organizational group of an enterprise, the user device being associated with that organizational group, wherein different organizational groups have different whitelists.

9. The non-transitory, computer-readable medium of claim 7, wherein the list is the blacklist and is received at the print server from the management server.

10. The non-transitory, computer-readable medium of claim 7, wherein the model identifies similarity to a design patent, and wherein the list is the blacklist and disallows matching design patents.

11. The non-transitory, computer-readable medium of claim 7, wherein the model includes a first model for identifying object types and a second model for identifying similarity to design patents.

12. The non-transitory, computer-readable medium of claim 7, the stages further comprising, in an instance where the request is denied, sending an alert to an administrator that identifies the classification of the object.

13. A system for 3D printer management, comprising:

a non-transitory, computer-readable medium containing instructions; and a processor that executes the instructions to perform stages comprising:

receiving, at a print server from a user device, a request to print an object at a 3D printer;

applying a model to the object to determine a classification, wherein the model is trained by machine learning and the classification is based on shape information of the object;

determining whether to allow the request by comparing the classification against a list, wherein the list is one of multiple lists received at the print server from a management server, the multiple lists corresponding to different enterprise groups;

wherein the list is automatically selected for comparison based on the user device belonging to a first group of the different enterprise groups;

wherein the list is a whitelist or a blacklist; and in an instance where the request is allowed, printing the object at the 3D printer, wherein the classification represents an object type, wherein the whitelist includes allowed object types, and wherein the blacklist includes disallowed object types.

14. The system of claim 13, wherein the list is the whitelist and corresponds to an organizational group of an enterprise, the user device being associated with that organizational group, wherein different organizational groups have different whitelists.

15. The system of claim 13, wherein the list is the blacklist and is received at the print server from the management server.

16. The system of claim 13, wherein the model identifies similarity to a design patent, and wherein the list is the blacklist and disallows matching design patents.

17. The system of claim 13, wherein the model includes a first model for identifying object types and a second model for identifying similarity to design patents.

* * * * *